United States Patent
Eck et al.

(10) Patent No.: US 11,616,760 B1
(45) Date of Patent: Mar. 28, 2023

(54) MODEL THRESHOLDS FOR DIGITAL CONTENT MANAGEMENT AND SELECTION

(71) Applicant: META PLATFORMS, INC., Menlo Park, CA (US)

(72) Inventors: Matthias Gerhard Eck, San Francisco, CA (US); Juan Sebastian Rassa Robayo, New York, NY (US)

(73) Assignee: META PLATFORMS, INC., Menlo Park, CA (US)

( * ) Notice: Subject to any disclaimer, the term of this patent is extended or adjusted under 35 U.S.C. 154(b) by 528 days.

(21) Appl. No.: 16/796,741

(22) Filed: Feb. 20, 2020

(51) Int. Cl.
*H04L 29/06* (2006.01)
*H04L 9/40* (2022.01)
(Continued)

(52) U.S. Cl.
CPC ........ *H04L 63/0245* (2013.01); *G06K 9/6267* (2013.01); *G06Q 30/0255* (2013.01); *G06Q 30/0277* (2013.01); *G06Q 50/01* (2013.01)

(58) Field of Classification Search
CPC .............. H04L 63/0245; G06K 9/6267; G06Q 30/0255; G06Q 30/0277; G06Q 50/01
See application file for complete search history.

(56) References Cited

U.S. PATENT DOCUMENTS

| | | | | |
|---|---|---|---|---|
| 8,498,950 B2 * | 7/2013 | Yankov | ................... | G06N 20/00 706/12 |
| 8,965,115 B1 * | 2/2015 | Khosla | ................. | G06V 10/806 382/156 |

(Continued)

FOREIGN PATENT DOCUMENTS

| | | | | |
|---|---|---|---|---|
| CA | 2921672 C | * | 3/2019 | ............... G06K 9/00 |
| CN | 111050269 A | * | 4/2020 | ......... G10L 21/0208 |

(Continued)

OTHER PUBLICATIONS

Zachary C. Lipton, et al., "Thresholding Classifiers to Maximize F1 Score", California, USA, May 14, 2014, 16 pages.
Shameem A. Puthiya Parambath, et al., "Optimizing F-Measures by Cost-Sensitive Classification", Compiegne, France, Dec. 13, 2014, 9 pages.

(Continued)

*Primary Examiner* — Richard G Keehn
(74) *Attorney, Agent, or Firm* — Mannava & Kang, P.C.

(57) ABSTRACT

According to examples, a system for automatically optimizing thresholds of content processing models that select content for presentation to users may include a processor and a memory storing instructions. The processor, when executing the instructions, may cause the system to select a subset of the content processing models for a content policy grouping. The subset of content processing models comprises models selected from a plurality of content processing models based on content rejection rates and models that are selected based on corresponding model probabilities. The system may further obtain an optimized threshold for each model of the subset of content processing models based on an iterative global optimization technique. The system may thereby facilitate automatic selection or rejection of the content pieces for presentation to users on an online system based on the policies associated with corresponding content policy grouping by employing the subset of content processing models with the optimized thresholds.

20 Claims, 11 Drawing Sheets

(51) Int. Cl.
*G06Q 30/0241* (2023.01)
*G06K 9/62* (2022.01)
*G06Q 50/00* (2012.01)
*G06Q 30/0251* (2023.01)

(56) References Cited

U.S. PATENT DOCUMENTS

| | | | |
|---|---|---|---|
| 2013/0274628 A1* | 10/2013 | Fausti | A61B 5/123 600/559 |
| 2016/0012304 A1* | 1/2016 | Mayle | G06V 30/248 382/209 |
| 2016/0219295 A1* | 7/2016 | Satpathy | G06F 7/533 |
| 2017/0032247 A1* | 2/2017 | Tadesse | G06K 9/6265 |
| 2020/0274894 A1* | 8/2020 | Argoeti | G06F 7/556 |
| 2021/0097168 A1* | 4/2021 | Patel | G06F 21/566 |

FOREIGN PATENT DOCUMENTS

| | | | | |
|---|---|---|---|---|
| CN | 112166585 A * | 1/2021 | | H03F 1/3241 |
| CN | 113362902 A * | 9/2021 | | |
| WO | WO-2019204945 A1 * | 10/2019 | | G06K 9/00255 |

OTHER PUBLICATIONS

Prashant Gupta, "Boosting the accuracy of your Machine Learning models", May 30, 2017, 8 pages.

Augmented Startups, Random Forest—Fun and Easy Machine Learning, Jul. 12, 2017, 4:48-6:18 (C7). https://www.youtube.com/watch?v=D_2LkhMJcfY#action=share.

* cited by examiner

MODEL THRESHOLDS FOR DIGITAL CONTENT MANAGEMENT AND SELECTION

TECHNICAL FIELD

This patent application relates generally to digital content management and artificial intelligence (AI)-based models, and more specifically, to systems and methods to automatically optimize thresholds of AI-based models for digital content management and selection.

BACKGROUND

An online system, such as a social network system, provides digital content providers, such as marketers or advertisers, a platform to promote products or services to various users. Some online systems support digital content, such as dynamic product advertisements (DPAs), that not only provide recommendations of products or services to its users but also enable such users to execute actions to directly engage with the digital content. Digital content presented by any online system may need to be closely monitored to ensure that such digital content complies with various laws and restrictions, not to mention policies and requirements of the online system or other agencies. In this way, only compliant digital content will be provided or shown to users, while digital content that is not compliant will be rejected or disallowed by the online system.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1A:
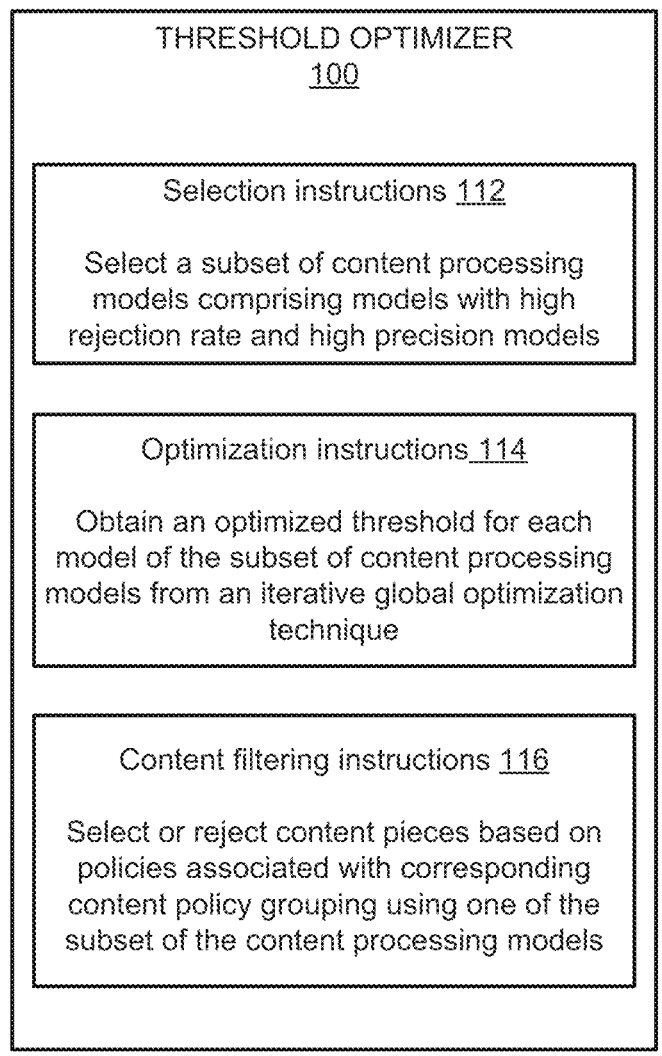
FIG. 1A illustrates a block diagram of a threshold optimizer that optimizes thresholds of the content processing models, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

An online system, such as a social network system, may host large quantities of digital content, such as advertisements for products or services, on any given day. The online system may select one product from a product database of numerous products (e.g., over ten billion products) and display digital content associated with the selected product, such as an advertisement for that product, to one or more users. A catalog of the products to be presented to users may be uploaded to a digital content platform that may be associated with the online system (e.g., social network system). In some examples, the digital content may be generated using the catalog and in a specific format. The digital content may then be selected and shown to users associated with the online system or social network system based on any number of factors, such as user preferences, browsing history, user groups or user associations, or other inputs.

As described above, some online systems may support digital content, such as dynamic product advertisements (DPAs), that not only provide recommendations of products or services to its users but also provide a way for such users to execute actions to more directly engage with the digital content. For example, one such action may include direct interaction with the DPA to purchase products or services. In addition, such digital content may also enable digital content providers to calculate or measure various metrics. For example, a digital content provider may be able to determine how many users were shown the digital content, how many users interacted with the digital content, and/or other metrics associated with the digital content in reaching any number of users. However, digital content that is presented (or to be presented) by any online system or social network may need to be closely monitored to ensure that such digital content complies with various laws and restrictions, not to mention policies and requirements of the online system, social network, or other regulatory agencies.

In some examples, the online system may include or interact with a digital content platform to initially componentize a content piece to be shown to the users. As used herein, a content piece may refer to a particular object in the digital content. For example, if the digital content is an advertisement for an automobile, the content piece may refer to a particular object of the digital content, which, in this case, may be the automobile that is shown in the digital content of advertisement. Details of or associated with the content piece, in this example, may include, among other things, make, model, year, style, view or perspective of the automobile, etc. The componentization action may involve isolating the content piece into different content components. For example, this may include analyzing one or more of a product name, an image, and/or textual or audio content associated with the product, etc. The content components may then each be analyzed separately. In some examples, the content components may be analyzed to match products to users. The content components, in some scenarios, may be used to determine compliance or violation of policies that may be associated with various products.

By way of illustration, certain content pieces may be required, for example, to comply with various policies associated with presenting digital content depicting or associated with guns ("gun policy"). In this case, those content pieces that include one or more guns may be classified and grouped under the gun policy. Similarly, certain content pieces may be required to comply with policies associated with age-appropriate content ("age-gated policy") that have been set for the online system, such as policies for displaying nudity or sale of alcohol. In this case, such content pieces may be classified and grouped under the age-gated policy. In an online system such as a social network, there may be additional or other regulations, standards, or guidelines that help establish policies. Accordingly, thresholds for content management/selection/approval associated with the policies that are used to select or reject the content pieces for presentation to users of the online system may be provided. Thus, the content components of products under specific policies (e.g., for guns, alcohol, etc.) may be analyzed to determine compliance of the products (or DPAs associated with the products) with any number of rules associated with the policies.

Due to a potentially large volume of digital content in any given time period, there may only be a limited amount of time to review the digital content (e.g., DPAs). Although automatic review of digital content without any proactive human intervention or analysis may be provided, such review is typically and traditionally limited to a few general areas, such as categorization into policy groupings for compliance. It should be appreciated that automatic monitoring techniques, such as employing machine learning (ML) based content processing models and rules, may be employed for reviewing digital content for compliance with one or more policies. In these scenarios, automated review of the digital content may require each of the content processing models designated to process content to have a single reject/approve threshold in place. Each item of the digital content may be based on a product (or service), and may therefore include a product component, an image component, a textual component, or other component. It should be appreciated that the term "product," as used herein, may also refer to any product, service, or other element being presented, offered, or displayed via the digital content or DPA.

In practice, more than two hundred and fifty product and/or product component level models may be involved in the review process of the digital content. The review process may include determining one or more attributes, including any number of policy groupings associated with the digital content, and/or determining compliance of the digital content with rules of associated policies. The result of the review process may include approval and/or denial of the digital content. For example, if the digital content complies with the rules of the one or more policies, the digital content may then be provided (e.g., presented or displayed) to any number of users associated with the online system. However, if the product or product component level models reject the products or digital content associated with the rejected products, e.g., because they do not comply with the rules of the policies into which the DPAs are categorized, then the rejected products and/or digital content associated with the rejected products may be rejected or denied for presentation or display to users. It should be appreciated, that the phrase "policy groupings," as used herein, may be used interchangeably with "group of policies" and may refer to collections of content pieces that are grouped together based on one or more policies that are applicable to the content pieces to be presented to users on the online system.

In some examples, a rating level may also be provided as part of the review and analysis. For instance, the rejected products and/or digital content associated with the rejected products may be designated a rating level that may correspond to a high-risk level, a medium-risk level, and a low-risk level. It should be appreciated that the risk level, in this scenario, may indicate a potential risk of consequences that may result if the product is erroneously approved. The various policies of the online system may have corresponding rules based on the risk level associated with the products under the policy groupings. Other various rating levels or rating schemes may also be provided.

It should be appreciated that the product or product component level models and/or the corresponding approval or rejection thresholds may be set based on content attributes. In some examples, the content attributes may be used to balance precision of the product or product component level models with an overall number of rejections while considering one or more risk levels associated with the content pieces violating one or more policies. The content pieces that violate one or more policies may herein be referred to as targeted violations. In some examples, the approval or rejection thresholds may be set for the various product and product component level models.

Rejections generated by the models may be sampled and the model precision at a certain threshold may also be determined or measured. It should be appreciated that the term "precision," as used herein, may be used interchangeably with "predictability" or "performance" and may generally refer to how well the model is reliably operating or responding to any given task. In an example, the model precision or predictability can be determined based on the accuracy of the model in selecting or rejecting content pieces based on compliance or non-compliance of the content pieces with certain policies. It should be appreciated that once thresholds are set, they may be seldom revised as there may be hundreds of content processing models for which the thresholds may need to be adjusted or optimized routinely. As a result, model performance may drift and thereby cause the product model and product component level model to generate erroneous results. In some cases, this may include rejecting legitimate content that complies with rules and/or approving non-compliant content. To remedy this situation, one option may be to adjust thresholds that involve setting model precision and auto-adjusting other thresholds accordingly. However, it should be appreciated that this option may not fully take into account that some models overlap (e.g., multiple models may reject the same product). Additionally, this option may not fully appreciate the various risk levels of the rejected products, as described above. Thus, an approach that involves optimizing model thresholds at any given time may help, among other things, take into account model overlaps and/or the risk levels of the rejected products.

Specifically, threshold optimization, in some examples, may accept a lower precision or predictability for a model if the model can reject high-risk violations. Lower precision may be balanced or mitigated by other models that may be adjusted to higher precision. For example, content processing systems and methods described herein may aim to optimize scaling factors globally across various models in order to reduce false negatives (FNs) and/or false positives (FPs), while seeking to increasing true positives (TPs) and/or true negatives (TNs). Thresholds of the product and product component models, as described herein, may be adjusted so that a balance may be achieved. In particular, digital content associated with high-risk products may be properly rejected and/or digital content associated with product approvals may be kept at acceptable levels, which in turn may effectively maintain and manage digital content distribution at the online system.

Accordingly, the content processing systems and methods described herein may employ a multi-action process to optimize thresholds. This multi-action approach may provide a more streamlined and/or automatic process to obtain optimal thresholds for digital content management and selection. For example, the number of content processing models, including the product and product component models, may initially be reduced. In some instances, this may be achieved via dimensionality reduction. Dimensionality reduction, as used herein, may refer to a process for reducing the number of models to be analyzed for threshold optimization. It should be appreciated that when the number of models to be analyzed are reduced, this may reduce complexities involved in threshold optimization and increase the overall speed of processing. As a result, a selected predetermined number of content processing models having high content rejection rates and high precision rates may be stored as a subset of the content processing models for threshold optimization. Additional actions may also be taken.

Further, the thresholds may be selected or optimized for the selected subset of the content processing models using an optimization procedure. This may be achieved, for example, by using a "smart search" (or other similar search feature), as further described herein. In some examples, the thresholds being optimized may be a combination of parameters. For instance, one or more metrics may be used. These may include a metric associated with prevalence of poor user experiences, such as policy-violating impressions live (PVIL), false discovery rate (FDR), or other similar metrics. In some examples, the optimization procedure may output a set of feasible PVIL/FDR combinations, which may be achieved through the subset of content processing models. It should be appreciated that the optimization procedure to output a set of feasible PVIL/FDR combinations may reduce complexity, increase speed, and maximize resources for improved accuracy. Other various actions for optimizing thresholds may also be provided.

It should be appreciated that the threshold optimization achieved by the content processing systems and methods described herein may be executed in a variety of ways and in a variety of environments. In some scenarios, this may be achieved automatically, for example, on a periodic basis. As a result, a computing system (e.g., online system) implementing such content processing systems and methods may be enabled to automatically (or semi-automatically) set thresholds for the content processing models. In some examples, this may be achieved with very little, if any, need for any type of manual intervention or analysis, which may be costly and time-consuming. Moreover, the dimensionality reduction process may also allow for a more efficient way to provide automatic setting of thresholds. In some examples, such efficiency may be achieved by addressing content processing model overlaps since many content processing models that repeat the same content rejections may have been initially eliminated and thresholds may be optimized for the selected subset of content processing models.

In addition, the optimization method, as described herein, may also set a threshold for each content processing model while taking into account the effect on the thresholds of other content processing models. This may be contrasted with a calibration approach, for instance, where for each content processing model, a calibration curve may be estimated. The calibration approach may typically achieve local optimization and hence, one content processing model cannot be configured to be less precise and reject more while another is set to be more precise. However, such variable precisions in the content processing models, as provided by the content processing systems and methods disclosed herein, may enable configuring those content processing models which process high-risk violations with greater accuracy, precision, and speed. Additionally or alternatively, the content processing models that process as medium-risk or low-risk violations may be set to be less precise, which may thereby leverage processor resources and supply more digital content (e.g., DPAs) to the online system (e.g., social network platform). These and other benefits or advantages will be apparent in the examples described herein.

Figure 1B:
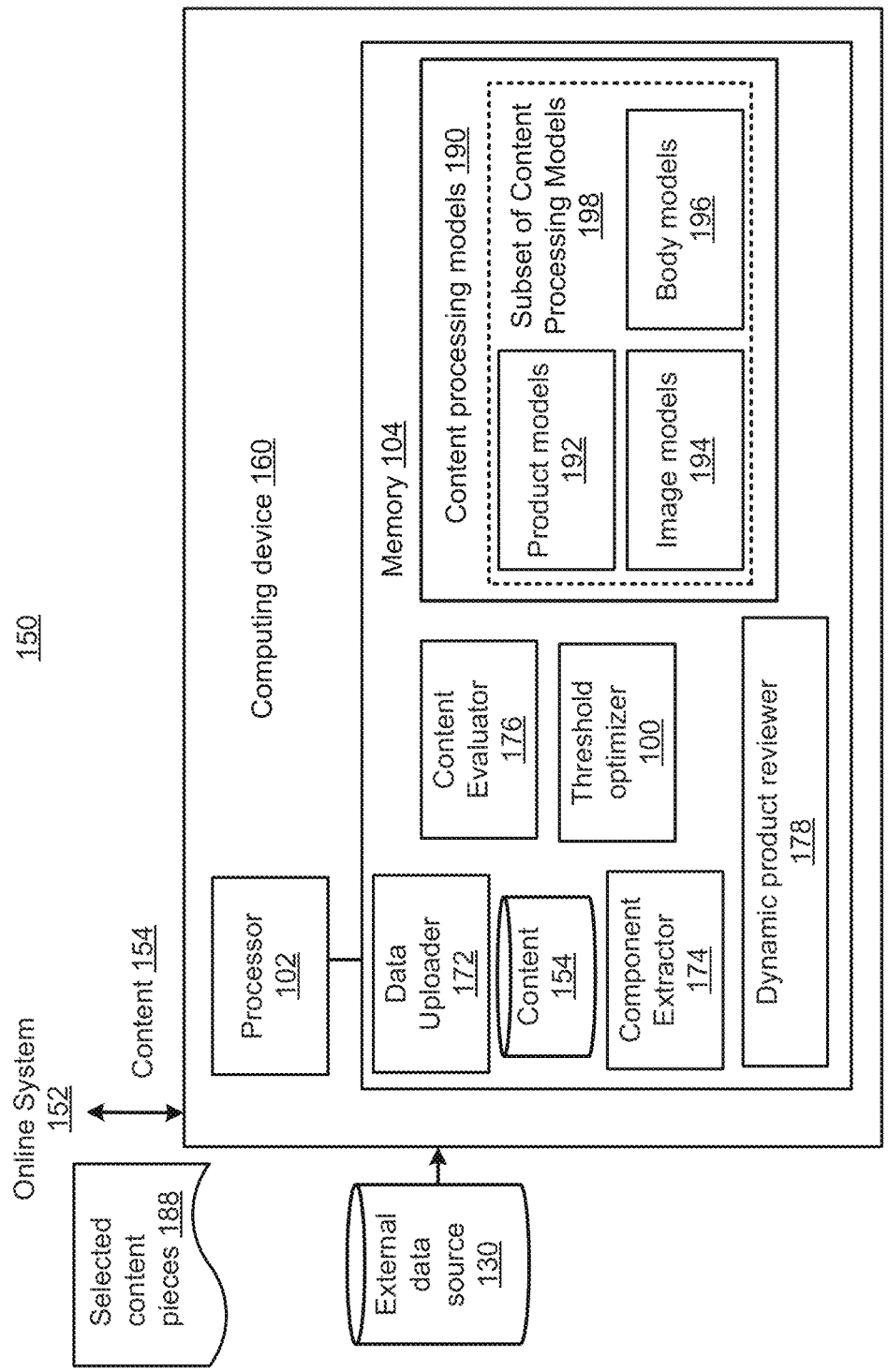
FIG. 1B illustrates a block diagram of a system environment including a computing device in which the threshold optimizer may be implemented, according to an example.

Reference is now made with respect to FIGS. 1A and 1B. FIG. 1A illustrates a block diagram of a threshold optimizer 100 for optimizing thresholds of content processing models, according to an example. FIG. 1B illustrates a block diagram of a system environment 150 in which the threshold optimizer 100 may be implemented to optimize the thresholds of the content processing models, according to an example. It should be appreciated that the threshold optimizer 100 depicted in FIGS. 1A-1B and/or the system environment 150 depicted in FIG. 1B may be examples. Thus, the threshold optimizer 100 and/or the system environment 150 may or may not include additional elements or features and some of the elements or features described herein may be removed and/or modified without departing from the scopes of the threshold optimizer 100 and/or the system environment 150 outlined herein.

As shown in FIG. 1B, the system environment 150 may include an online system 152, a computing device 160, and an external data source 130, all of which may be communicatively coupled to each other via one or more networks. It should be appreciated that the computing device 160 is shown as being separate from the online system 152 for illustration purposes only and that the computing device 160 may be integrated, partially or completely, with the online system 152, in accordance with an example. The computing device 160 may be connected to an external data source 130 to access additional data.

Content 154 may be exchanged between the online system 152 and the computing device 160. In some examples, the online system 152 may be a social network platform or other online system that communicates information over a network (not shown) with the computing device 160 or other network element. In some examples, the content 154 may include various digital content, such as dynamic product ads (DPAs). For instance, the content 154 may be generated from a catalog of a provider in a predetermined digital content format. In some examples, the content 154 may be provided and/or displayed to users of the online system 152 based on one or more metrics, such as user history (e.g., same or similar to products previously viewed on the online system 152 or elsewhere), as determined by various recommendation models that may suggest relevant products or services. Based on the number of users associated with the online system 152, it should be appreciated that billions of impressions may be provided per day for millions of distinct products. For example, there may be around 4.5 to 5 billion impressions provided per day for around 100 million distinct products. An impression may include one of many elements, such as a memory, recollection, or thought associated with a product or service that a user may have based on the content presented to the user. The impression may be one of many experienced by a user during a customer journey towards purchasing or not purchasing a product or service. The 100 million distinct products to be shown to users may be selected each day (or other predetermined time period) from a database of over a multitude of (e.g., 10 billion) products within the system environment 150. The content 154 may be received, transmitted, and/or processed by the computing device 160, which may include, among other things, a processor 102 and a memory 104 that stores instructions (e.g., code) that are executable by the processor 102 for processing or analyzing the content 154.

It should be appreciated that the processor 102 may be a semiconductor-based microprocessor, a central processing unit (CPU), an application specific integrated circuit (ASIC), a field-programmable gate array (FPGA), and/or other suitable hardware device. In some examples, the memory 104 may have stored thereon machine-readable instructions (which may also be termed computer-readable instructions) that the processor 102 may execute. The memory 104 may be an electronic, magnetic, optical, or other physical storage device that contains or stores executable instructions. The memory 104 may be, for example, Random Access memory (RAM), an Electrically Erasable Programmable Read-Only Memory (EEPROM), a storage device, an optical disc, and the like. The memory 104, which may also be referred to as a computer-readable storage medium, maybe a non-transitory machine-readable storage medium, where the term "non-transitory" does not encompass transitory propagating signals. Only one computing device 160 is shown herein for simplicity. However, it should be appreciated that multiple computer devices may also be provided. For instance, it should also be appreciated that the machine-readable instructions may reside on multiple computing devices which may even be located remote from each other while being communicatively coupled to each other to execute the threshold optimizer 100.

In some examples, the computing device 160 may be connected to an external data source 130 to access data archives, or to store data such as rejected and/or approved (or selected) content, content metadata, etc. The memory 104 may include, among other things, a data uploader 172, a component extractor 174, a content evaluator 176, and a dynamic product reviewer 178. The computing device 160 may also include a threshold optimizer 100 to process and help assist the optimization of thresholds of one or more content processing models 190. Each of these elements, as well as others, will be described in more detail below.

In some examples, the data uploader 172 may enable the computing device 160 to access one or more catalogs (e.g., product catalogs) and/or to generate the content 154 (e.g., DPAs or other similar content) from such product catalogs. Information regarding millions of products, for example, may be uploaded by vendors at a time via the data uploader 172. The data that is received may be uploaded in a predetermined format, which may include multiple content components, such as a product name, a product id, an image, a text-based information, and/or other multimodal data.

The component extractor 174 may componentize the products into an individual product name, product id, image, and/or body components. Due to the large upload volume, content components which are extracted from the content 154 may be evaluated using the content evaluator 176. In some examples, the content evaluator 176 may evaluate the content 154 automatically or semi-automatically once it has been extracted. The computing device 160 using the content evaluator 176, for example, may reject product catalogs or specific product information that are not compliant with the format requirements for the content components. The content evaluator 176 may employ the content processing models 190 for evaluating each content component of each content piece, e.g., the DPAs received by the data uploader 172. The content processing models 190 may include (separate) product models 192, and product component level models such as image models 194, and body models 196 for evaluating products, and components including image and textual content components included in the content pieces. In an example, 200-250 models may be used for the tasks of content evaluation and selected. Evaluation of the content pieces may not only involve evaluation for format compliance but also for categorizing the content pieces into one or more policy groupings by the product models 192, and determining if the content pieces comply with the one or more policy groupings. In an example, a content item can be approved for presentation on the online system 152 if the content item can initially clear the thresholds of the product models 192. Furthermore, one or more of the image or textual components of the content item also need to clear the thresholds of the image models 194 and body models 196. While some of the content processing models 190 may be used for only one of the policy groupings, different instances of certain other content processing models which may have similar or different thresholds may be used for different policy groupings. The content processing models 190 may include models based on at least one artificial intelligence (AI) technique or methodology. For example, these may include, but not limited to, linear regression, logistic regression, classifiers such as support vector machines (SVMs), decision trees (e.g., gradient-boosted decision trees), learning vector quantization, naïve Bayes, K-nearest neighbors, bagging and random forest, neural networks (e.g., deep neural networks), etc.

A corresponding one of the content processing models 190 may score each component of each of the content pieces. For example, the product ID component of a content piece may be scored by one of the product models 192, the image of the content piece may be scored by one of the image models 194 while the body of the content piece may be scored by the body models 196. Each score of each of the components of the content piece may be compared to a corresponding threshold for content selection that is set for the evaluating model. Various schemes may be implemented for determining whether or not the content piece is approved/selected for display to the users or if the content piece should be rejected. For example, if the content piece clears the thresholds set for each of the (corresponding) product models 192, image models 194 and the body models 196 for a given policy, it may be determined that the content piece complies with some or all policies and is therefore approved. In some examples, approved products or content pieces, such as DPAs, may be identified or selected for display to an administrator for further validation in an example. The administrator may validate the approved content pieces prior to dissemination among the users of the online system 152 based on policies or additional rules associated with the policy grouping using the dynamic product reviewer 178. For example, the additional rules may include age-related rules for adult-health content category or subscriber rules for proprietary content, etc.

The threshold optimizer 100, as described herein, may optimize the threshold for content selection for each of the content processing models 190. The threshold optimizer 100 is stored in the memory 104 with instructions executed by the processor 102. The instructions, stored in the memory 104 may include selection instructions, optimization instructions, and content filtering instructions. The selection instructions may include selecting a subset of content processing models 198 from the content processing models 190. The selection instructions may also cause the processor 102 to select those content processing models having high rejection rates and high predictive models to validate or approve content for a plurality of policy groupings. In some examples, there may be approximately 100-150 million products reviewed per day, with approximately 3-7 million of associated content being rejected (and the rest approved). Top models may reject 10,000 or more products per day (often with overlap with other models). Reducing the number of models for optimizing thresholds may increase the efficiency of the optimization process in view of the large number of content processing models 190. In some examples, the models with high rejection rates and models with high precision may be selected for the subset 198 as output from these models has a higher impact than the remaining content processing models.

The memory 104 may also store optimization instructions 114 to obtain an optimized threshold for each model of the subset of content processing models 198 of the selected content processing models. The corresponding precision-recall curves may be generated in accordance with examples detailed herein. Generally, a precision-recall curve may plot different values of precision and recall for a given content processing model. Each content processing model may approve or reject a content component (or a content piece if it has only one content component) based on the threshold for content selection/approval that combines recall and precision model attributes in a predetermined ratio. It should be appreciated that there may be no individual precision-recall curves for each model. For instance, in a more traditional approach, these precision-recall curves may be used to set rejection thresholds at a certain precision, which may be referred to as "calibration." In effect, this may allow connecting arbitrary model scores with the actual precision. In other words, instead of choosing thresholds with individual precision-recall curves, iterative optimization of joint model performance in terms of global (not individual) precision and recall may be provided, such that at each iterative step, a specific threshold for one model may be set, but the systems and methods described herein may generally look at the global change. As such, this configuration may enable at least one implicit benefit or tradeoffs, namely that for one model, a lower precision may be accepted (if that helps catch a lot of violating items), while another model with higher precision may help balance things out. Hence, the term "iterative optimization" or "iterative global optimization technique" may be used interchangeably with precision-recall curve or to describe the approach of joint model performance in terms of global precision and recall, rather than purely individual precision-recall curves as described herein.

The term "recall," as used herein, may pertain to a model attribute that may cause a content processing model to reject non-compliant content while precision pertains to a model attribute that enables the content processing model to select or approve a compliant content piece. In other words, "recall" may refer to a percentage of product rejections from a total number of products that should be rejected while "precision" may refer to a percentage of product rejections that were, in fact, correctly rejected. A content processing model with higher recall may be biased towards identifying non-compliant content pieces and hence may have higher rejection rates. On the other hand, a content processing model with higher precision may be biased towards selecting or approving content pieces for presentation on the online system 152. In some examples, the precision-recall curves may be generated starting with minimum values as thresholds, for example, at the origin with zero as the threshold value. However, the precision-recall curves may be generated by the threshold optimizer 100 using the current thresholds which may have already been established by a user as the starting points. The memory 104 may further store content filtering instructions to select or reject content pieces based on policies associated with the corresponding content policy grouping by employing at least one of the subset of content processing models 198. The selected content pieces 188 may be forwarded for validation by an administrator prior to being presented or displayed to the users of the online system 152. In an example, the users to whom the selected content pieces are displayed may be identified based on the rules or gating policies of the content policy grouping. For example, if the content piece is a DPA for an alcoholic drink, it may be associated with an age-restricted category and therefore may not be appropriate to show to underage users. Such a content piece and corresponding DPA should therefore be rejected or not approved. There may be other DPAs or content that are rejected or selectively displayed based on the laws governing a jurisdiction. The subset of content processing models 198 with the thresholds that are automatically optimized may enable the online system and/or computer device towards more accurate and efficient policy enforcement.

Figure 2:
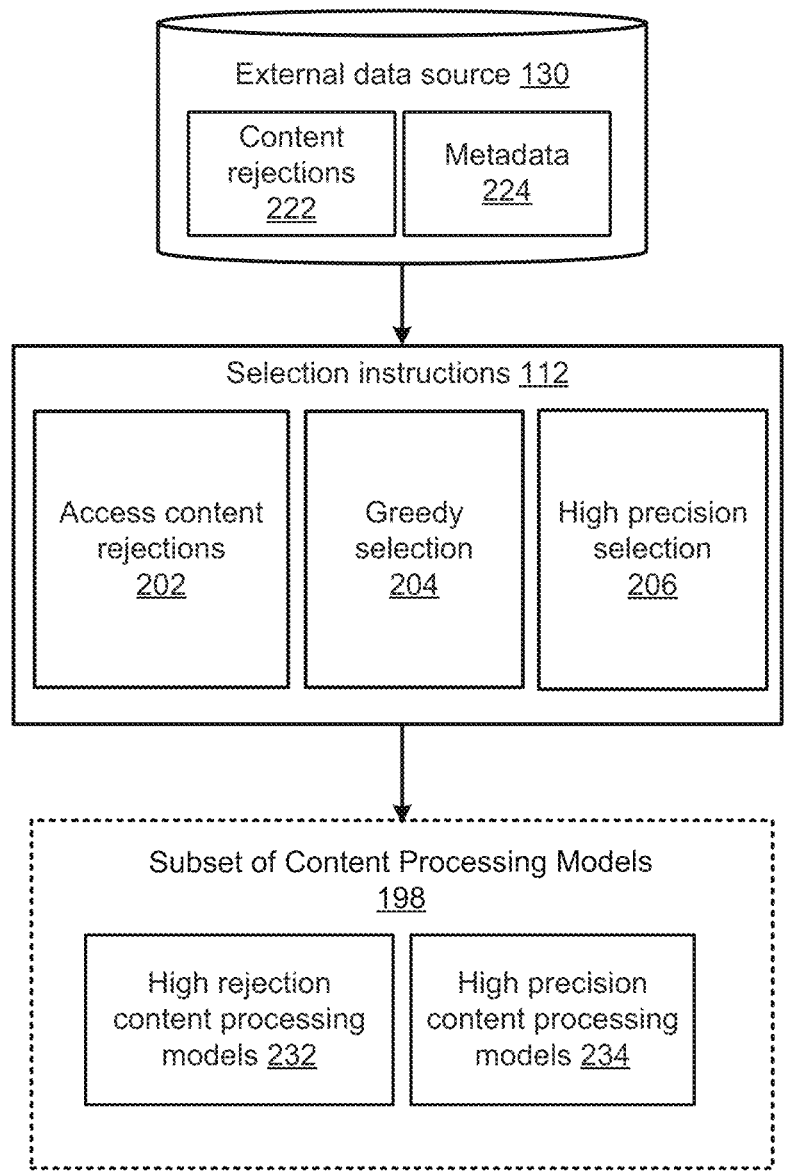
FIG. 2 illustrates a block diagram with details of selection instructions, according to an example.

FIG. 2 illustrates a block diagram 200 with details of the selection instructions 112 according to an example. The selection instructions 112 may include instructions to access content rejections 202, instructions for greedy selection 204, and instructions for high precision model selection instructions 206. For example, the instructions for greedy selection 204 may configure the computing device 160 to access the content rejections 222 that are routinely generated by the threshold optimizer 100. For instance, the processor 102 may access periodic content rejections, such as daily content rejections produced for a predetermined period, such as a month or other similar duration. In an example, the content rejections 222 may not only include the rejected content pieces, but also metadata 224 associated with the rejected content pieces, such as the identity of the model(s) rejecting the content pieces, the dates/times of rejections, etc. Using such metadata 224, high rejection content processing models 232 for the content processing models that generate most of the content rejections 222 may be selected by the instructions for greedy selection 204. In an example system, it should be appreciated that a set of 250 models may cover at least 99% of the content rejections 222 in many content policy groupings. The instructions for greedy selection 204 may bias the threshold optimizer 100 towards recall. Recall may pertain to the threshold optimizer 100 gearing the threshold of a content processing model towards identifying content pieces that are non-compliant with the policies of a particular policy grouping at the expense of good, compliant content pieces, which may also be rejected. The high precision model selection instructions 206 may cause the processor 102 to select high-precision content processing models 234 with thresholds biased towards approval from the content processing models 190 that remain after the selection of the content rejection models 242 as detailed further herein. The high precision model selection may balance the threshold optimizer 100 towards precision wherein the selection of good content pieces carries higher weight. In an example, additional top predictor models (e.g., 40 models) may be selected by the high precision model selection instructions 206. The high rejection content processing models 232 together with the high-precision content processing models 234 may form the subset of content processing models 198. The high rejection content processing models 232 and the high-precision content processing models 234 may include one or more of the product models 192, image models 194, the body models 196, and/or other type of component model (e.g., title model) selected from the content processing models 190.

Figure 3:
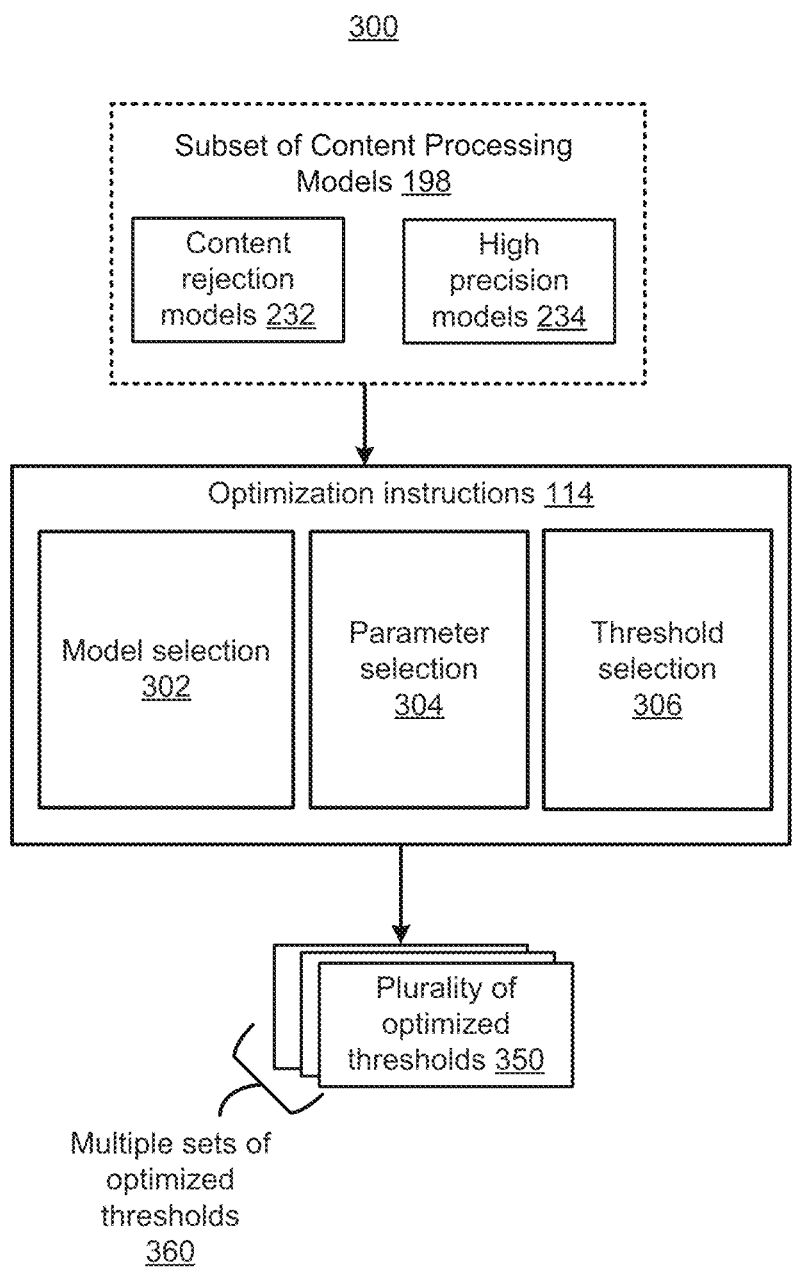
FIG. 3 illustrates a block diagram with details of optimization instructions, according to an example.

FIG. 3 illustrates a block diagram 300 with details of the optimization instructions 114 according to an example. The optimization instructions 114 automatically optimize content selection thresholds for each model of the subset of content processing models 198 per policy grouping. The optimization instructions 114 include instructions for model selection 302, instructions for parameter selection 304 and instructions for threshold selection 306. The instructions for model selection 302 cause the processor 102 to loop over the subset of content processing models 198 that pertain to each of the policy groupings for optimizing the thresholds. Upon selecting one of the subset of content processing models 198, the instructions for parameter selection 304 may cause the processor 102 to select parameters that include combinations of PVIL and FDR values. Each free parameter (ß), which may have an associated expected combination of PVIL and FDR, may be used to obtain a value for an optimization function $F_\beta$ using Eq. (1) as follows:

$$F_\beta = \frac{(1+\beta^2)}{\left(\frac{1}{\text{precision}} + \frac{\beta^2}{\text{recall}}\right)},$$

wherein precision is associated with FDR and recall is associated with PVIL. It should be appreciated that ß may be cover a wide range of free parameters, and the precision and the recall may be a global precision and a global recall, respectively, that are obtained, for example, by applying all model thresholds for automatic rejection decisions. In this way, a set of thresholds of the selected processing models may be obtained by the optimization function $F_\beta$ using Eq. 1 for a set of free parameters through a global iterative optimization technique, as described herein.

In an example where about 1000 quantiles may be taken from prior scores distributions as threshold candidates, for each model corresponding to a specific policy grouping, the instructions for threshold selection 306 may select a threshold value wherein the thresholds of the other models corresponding to the policy grouping remain unchanged during the iterations as detailed below. A plurality of optimized thresholds 350 corresponding to each of the models associated with a specific policy grouping may be output by the optimization instructions 114. Similarly, multiple sets of optimized thresholds 360 wherein each set of optimized thresholds respectively corresponds to each policy grouping of the multiple policy groupings that control content presentation on the online system 152 may be output by the optimization instructions 114.

To help illustrate the iterative or loop process for threshold optimization, an example is provided below. For simplicity, there may be some initial assumptions to be made. First, it may be assumed that there may only be three models: M1, M2, and M3, for which the systems and methods described herein may look to find optimal thresholds. The optimal thresholds may be: T1, T2, and T3. Second, it may be assumed that the process begins at: t1=1, t2=2, and t3=2. Third, again for simplicity, it may be assumed that the only threshold candidates may be as follows: for model 1 (M1): 1 and 2; for model 2 (M2): (2 and 3); and for model 3 (M3): 2, 4, and 5. Again, these assumptions are provided for simplicity of the example.

Based on these assumptions, the iterative threshold optimization process may proceed as follows for each of the models:

| Model 1: |
| --- |
| Compare $F_\beta$ (t1 = 1, t2 = 2, t3 = 2) vs. $F_\beta$ (t1 = 2, t2 = 2, t3 = 2); Pick either t1 = 1 or t1 = 2 depending on which $F_\beta$ value is bigger (Note that t2 = 2 and t3 = 2 may be left unchanged); and If the highest $F_\beta$ value was found with t1 = 2, then update t1 from 1 to 2. |

| Model 2: |
| --- |
| Compare $F_\beta$ (t1 = 2, t2 = 2, t3 = 2) vs. $F_\beta$ (t1 = 2, t2 = 3, t3 = 2) (Note that t1 = 2 and t3 = 2 may be left unchanged); and If the highest $F_\beta$ value was found with t2 = 3, then update t2 from 2 to 3. |

| Model 3: |
| --- |
| Compare $F_\beta$ (t1 = 2, t2 = 3, t3 = 2) vs. $F_\beta$ (t1 = 2, t2 = 3, t3 = 4) vs. $F_\beta$ (t1 = 2, t2 = 3, t3 = 5) (Note that t1 = 2 and t2 = 3 may be left unchanged, and also note that t1 and t2 may be different now than when the process started); and If the highest $F_\beta$ value was found with t3 = 5, then update t3 from 2 to 5. |

Thus, in a full loop, the updating of the thresholds for every model may be individually evaluated. In some examples, the iterative process may be designed to function full loops. For instance, the process may not stop at the end of Model 2 but must continue through Model 3, as shown in the example above. In this way, the process may end once a full loop (e.g., iteration through all the models) is completed, and no model threshold was updated from where the loop initially began. Using this method, it should be appreciated that false positives may be reduced or entirely eliminated. This is because the described threshold optimization may be focused simply on comparing values, and no decision may be taken here that could be attributed as a false positive. These and other advantages will be apparent using the systems and methods described herein.

Figure 4:
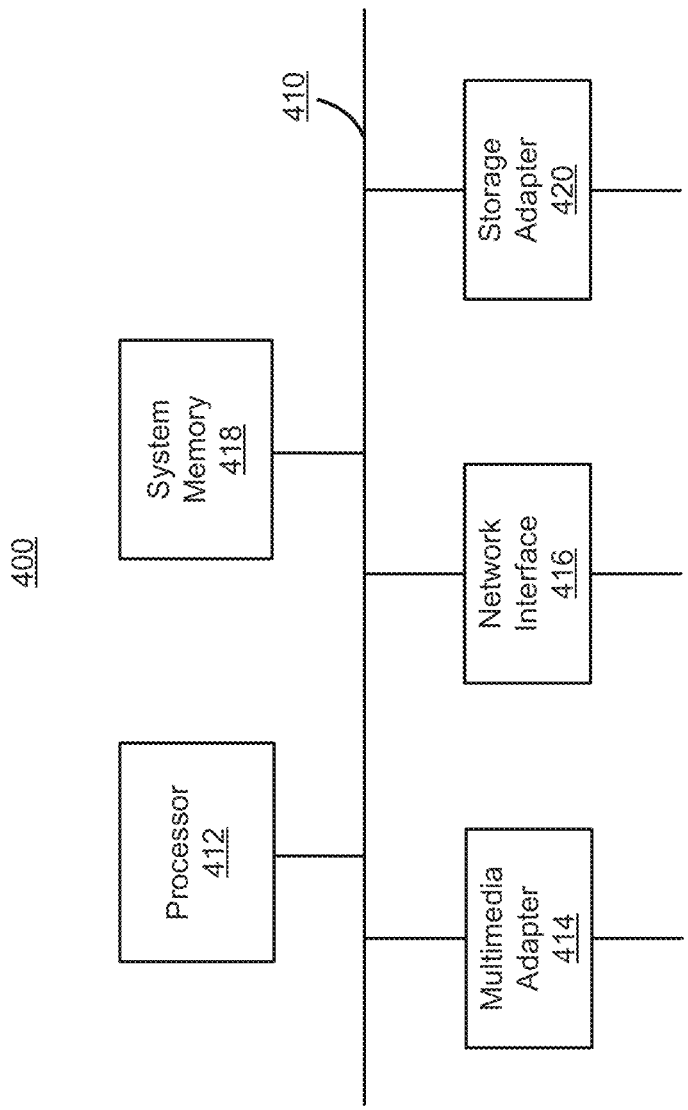
FIG. 4 illustrates a block diagram of a computer system for content processing, according to an example.

FIG. 4 illustrates a block diagram of a computer system 400 for content processing, according to an example. The computer system 400 may be part of or any one of the online system 152 or the computing device 160 to perform the functions and features described herein. The computer system 400 may include, among other things, an interconnect 410, a processor 412, a multimedia adapter 414, a network interface 416, a system memory 418, and a storage adapter 420.

The interconnect 410 may interconnect various subsystems, elements, and/or components of the computer system 400. As shown, the interconnect 410 may be an abstraction that may represent any one or more separate physical buses, point-to-point connections, or both, connected by appropriate bridges, adapters, or controllers. In some examples, the interconnect 410 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 410 may allow data communication between the processor 412 and system memory 418, which may correspond to the memory 104. The system memory 418 may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 412 (which may correspond to the processor 102) may be the central processing unit (CPU) of the computing device and may control the overall operation of the computing device. In some examples, the processor 412 may accomplish this by executing software or firmware stored in system memory 418 or other data via the storage adapter 420. The processor 412 may be, or may include, one or more programmable general-purpose or special-purpose microprocessors, digital signal processors (DSPs), programmable controllers, application-specific integrated circuits (ASICs), programmable logic device (PLDs), trust platform modules (TPMs), field-programmable gate arrays (FPGAs), other processing circuits, or a combination of these and other devices.

The multimedia adapter 414 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 416 may provide the computing device with an ability to communicate with a variety of remote devices over a network and may include, for example, an Ethernet adapter, a Fibre Channel adapter, and/or other wired- or wireless-enabled adapter. The network interface 416 may provide a direct or indirect connection from one network element to another, and facilitate communication and between various network elements.

The storage adapter 420 may connect to a standard computer-readable medium for storage and/or retrieval of information, such as a fixed disk drive (internal or external).

Many other devices, components, elements, or subsystems (not shown) may be connected in a similar manner to the interconnect 410 or via a network. Conversely, all of the devices shown in FIG. 4 need not be present to practice the present disclosure. The devices and subsystems may be interconnected in different ways from that shown in FIG. 4. Code to implement the present disclosure may be stored in computer-readable storage media such as one or more of system memory 418 or other storage. Code to implement the present disclosure may also be received via one or more interfaces and stored in memory. The operating system provided on computer system 400 may be MS-DOS®, MS-WINDOWS®, OS/2®, OS X®, IOS®, ANDROID®, UNIX®, Linux®, or another operating system.

Various methods detailed in the flowcharts below are provided by way of examples. There may be a variety of ways to carry out the methods described herein. Although the methods detailed below are primarily described as being performed by threshold optimizer 100 computer device 150 as shown in FIGS. 1A, 1B, 2 and 3, or computer system 400 of FIG. 4, the methods described herein may be executed or otherwise performed by other systems, or a combination of systems. Each block shown in the flowcharts described below may further represent one or more processes, methods, or subroutines, and one or more of the blocks may include machine-readable instructions stored on a non-transitory computer-readable medium and executed by a processor or other type of processing circuit to perform one or more operations described herein.

Figure 5:
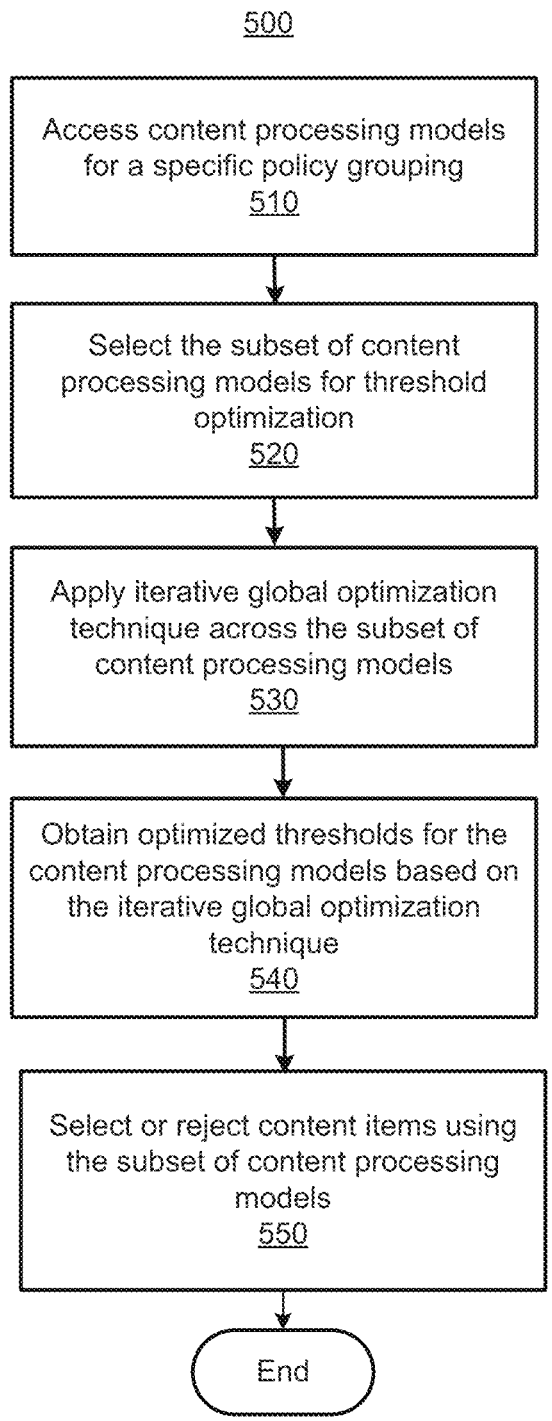
FIG. 5 illustrates a method of selecting or rejecting content corresponding to a policy grouping, according to an example.

FIG. 5 illustrates a method 500 of selecting or rejecting content including DPAs corresponding to a policy grouping for a display to users of the online system 152 according to an example. The method begins at 510 with the threshold optimizer 100 accessing the content processing models that are used to process content pieces associated with a specific, selected policy grouping or a policy bucket. As mentioned above, the online system 152 may have in place, various policy groupings for analyzing content pertaining to different sensitive subject matters such as alcohol, violence, adult health, etc. Different content processing models from the collection of the content processing models 190 may be used to analyze content pieces categorized under the various policy groupings. In an example, the metadata 224 of the content rejections 222 may be used to identify the content processing models that process content associated with the policy grouping selected at 510. Furthermore, the content pieces such as the DPAs may have a particular predetermined format with specified content components such as product id, an image and a body including text. Each of the content processing models 190 may be trained to process or analyze content pertaining to one of the content components and categorized under one of the policy groupings.

At 520, the subset of content processing models 198 is selected for threshold optimization using a dimensionality reduction process as detailed herein. Content processing models that have a high rejection rate may be initially selected. Subsequently, highly-predictive content processing models may be selected by omitting the already selected high rejection rate models from the pool of the content processing models 190. At 530, an iterative global optimization technique may be applied, as described herein, across the subset of content processing models. Optimized thresholds for the content processing models may then be obtained at 540, based on the iterative global optimization technique. The thresholds may be optimized periodically or the threshold optimization process may be initiated manually whenever required. The content pieces for dissemination on the online system 152 may be selected or rejected at 550 using the subset of content processing models 198 with the optimized thresholds.

Figure 6A:
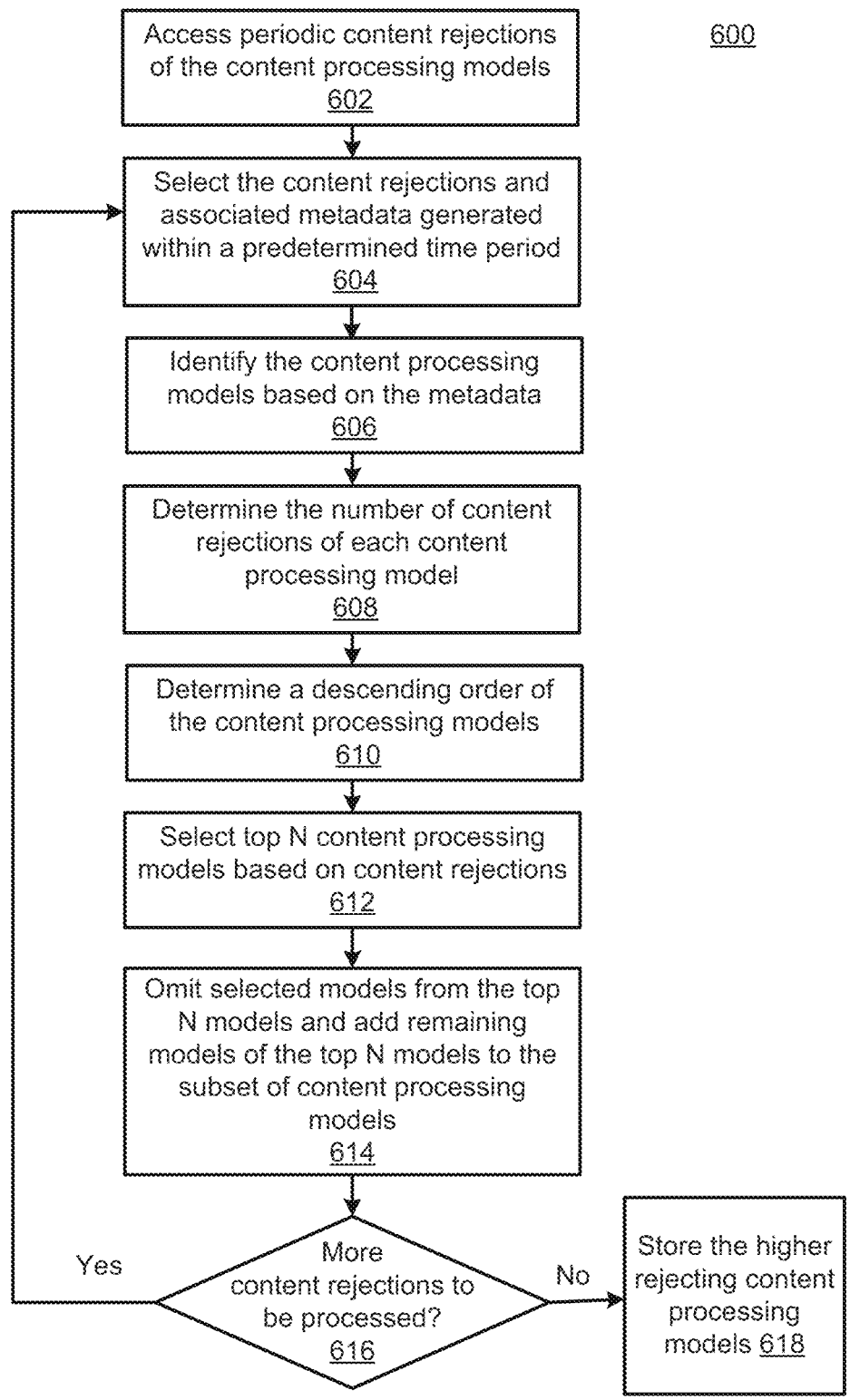
FIG. 6A illustrates a method that details a step in the process of selecting a subset of content processing models, according to an example.
Figure 6B:
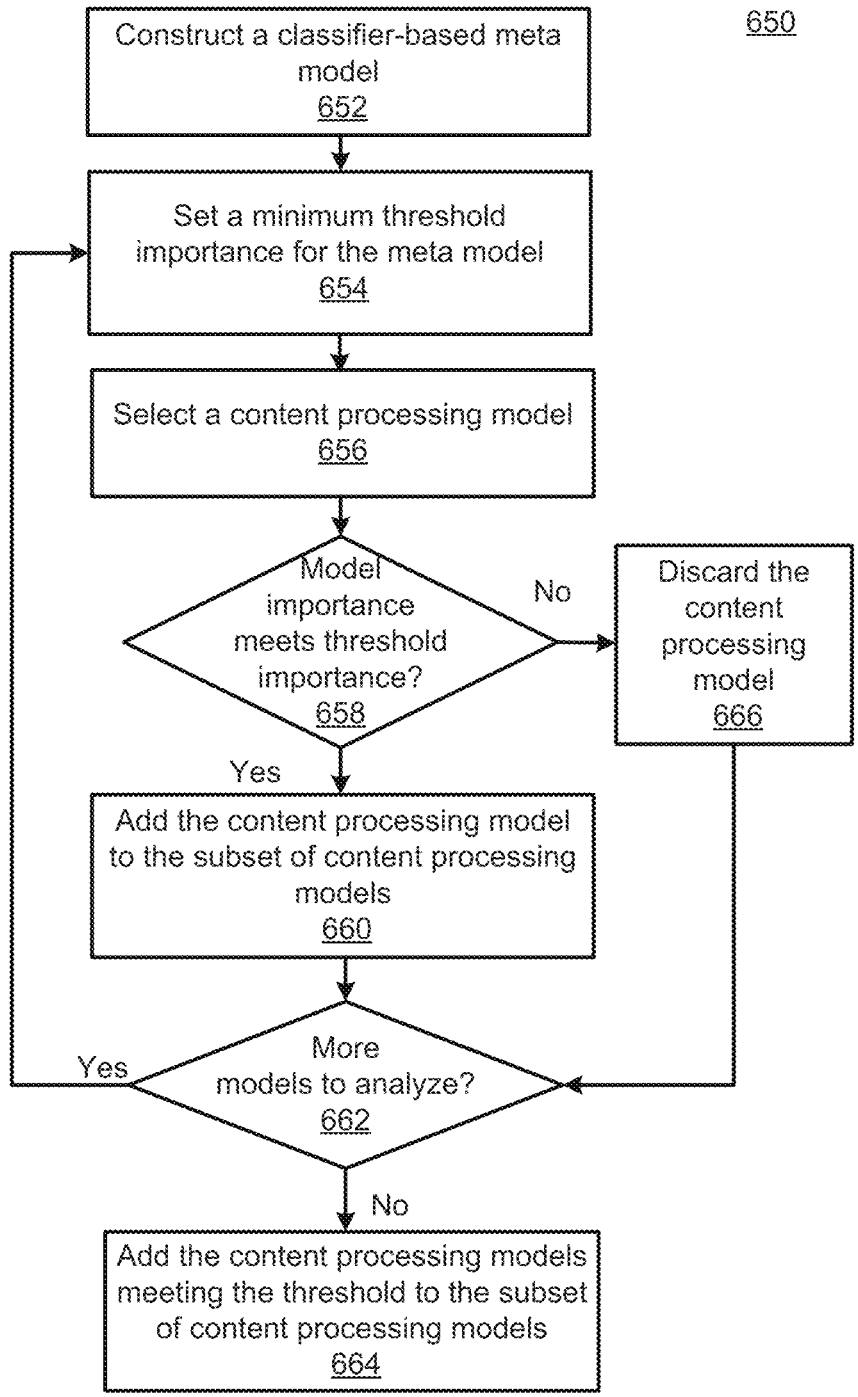
FIG. 6B illustrates a method that details another step in the process of selecting the subset of content processing models, according to an example.

FIGS. 6A and 6B respectively show details of methods 600 and 650 for selecting the subset of content processing models 198 according to an example. The selection of the subset of content processing models 198 occurs in two steps. FIG. 6A, illustrates the details of the initial step, which involves the selection of content processing models with high content rejection rates. In the subsequent steps, detailed in FIG. 6B, the models with the high content rejection rates that are already selected are omitted and high-precision content processing models are selected from the remaining pool of the content processing models 190. The process detailed in FIG. 6B enables recovering good predictor models that are useful in predicting or identifying policy/rule violations but were not 'rejecting enough' to be selected in the first step. As mentioned above, the subset of content processing models 198 selected using the methods 600 and 650 may pertain to a particular policy grouping. Therefore, the methods 600 and 650 are executed for each policy grouping of content being implemented on the online system 152.

Referring to FIG. 6A, at 602, the content rejections 222 periodically produced by the content processing models 190 are accessed along with the metadata 224 of the content rejections 222. In an example, the daily content rejections aggregated on a monthly basis may be accessed. The content rejections 222 may include the content pieces that were rejected due to various reasons. For example, content pieces may be rejected for not including images, or content pieces may be rejected for non-compliance with the policies, etc. The metadata 224 may include, but is not limited to, an identification of the content piece rejected, the specific content processing model rejecting the content piece and the date/time of rejection. At 604, the content rejections generated for a predetermined time period, for example, a month are selected. The content processing models associated with the content rejections are identified at 606 from the metadata 224. Based on the metadata 224 the number of content rejections produced by each of the content processing models 190 is determined at 608. It may be noted that the determination of the number of content rejections generated by each of the content processing models 190 may occur serially in one example. The serial processing of content rejections at 608 involves discarding content pieces or products that were rejected by a particular content processing model from consideration in subsequent iterations. Thereby, overlaps between the content processing models wherein the same content pieces are rejected by multiple content processing models may be avoided.

A descending order of the content processing models 190 based on the number of content rejections produced is determined at 610. One or more of the content processing models 190 that reject the highest number of content pieces or products are selected at 612 from the descending order of the content processing models. For example, the top N content processing models (N being a natural number) with the highest content rejection rates may be selected at 612. At 614, if any of the top N content processing models were previously selected in prior iterations, the selected models are omitted and the remaining ones of the top N content processing models are added to the subset of content processing models 198. At 616, it is determined if further content rejection data remains to be processed. If yes, the method returns to 604 to select the next block of content rejections. In an example, the method iterates over the content rejections until about 99% of the content rejections are processed. If no more content rejections remain for processing, the selected content processing models with higher rejection rates are stored at 618 as the subset of content processing models 198.

Turning now to FIG. 6B, the second step of selecting high precision models is detailed in method 650. At 652, an Artificial Intelligence (AI) classifier-based meta model is constructed for a policy grouping using as features, historical model scores for content pieces categorized under the policy grouping. The importance of a content processing model is used as a model-selection criterion. The importance of the content processing model is based on the accuracy of the model in approving or rejecting the content pieces associated with the policy grouping. The importance of the content processing model is indicative of the content processing model's precision in sorting the content pieces associated with the policy grouping. The relative importance of a content processing model may be determined, for example, via human validation of the content selections and rejections produced by the content processing model for a given policy grouping. In other words, relative importance may be based on feature predictability described herein. Accordingly, a minimum threshold importance may be set within the meta model at 654 for selecting the content processing models based on precision. In an example, the threshold importance may be determined by a user empirically based on the median accuracy of the content processing models in approving/rejecting the content pieces based on the rules of the policy grouping. At 656, a content processing model is selected from the content processing models 190 that remain after the content processing models with high rejection rates are selected in the previous step detailed above in FIG. 6A.

It is determined at 658 if the importance of the selected content processing model meets the threshold importance. In an example, the content selections or rejections produced by the selected content processing model may be validated by a user to determine that precision (and hence the importance) of the content processing model in processing the content pieces. If it is determined at 658 that the selected content processing model meets the threshold importance, the content processing model is added to the subset of content processing models 198 at 660 and the method moves to 662. At 662, it is determined if there are more content processing models that are to be analyzed. If it is determined at 662 that there are content processing models to be analyzed, the method returns to 656 to select the next content processing model for analysis. If it is determined at, 662 that there are no content processing models to be analyzed, the content processing models that meet the importance threshold are added to the subset of content processing models at 664.

If it is determined at 658 that the content processing model does not meet the threshold importance, the selected content processing model is discarded at 666 and the method returns to 662 wherein it is determined if there are more content processing models that remain to be analyzed. In an example, about 30-40 high-precision models were selected from about 250 content processing models. Together with about 99 high-rejection models, about 140 models were included in the subset of content processing models 198 thereby significantly reducing the number of models for threshold optimization. It may be appreciated that the numbers are disclosed herein for illustration purposes only and that different results may be achieved for different policy groupings using various models for different content.

Figure 7:
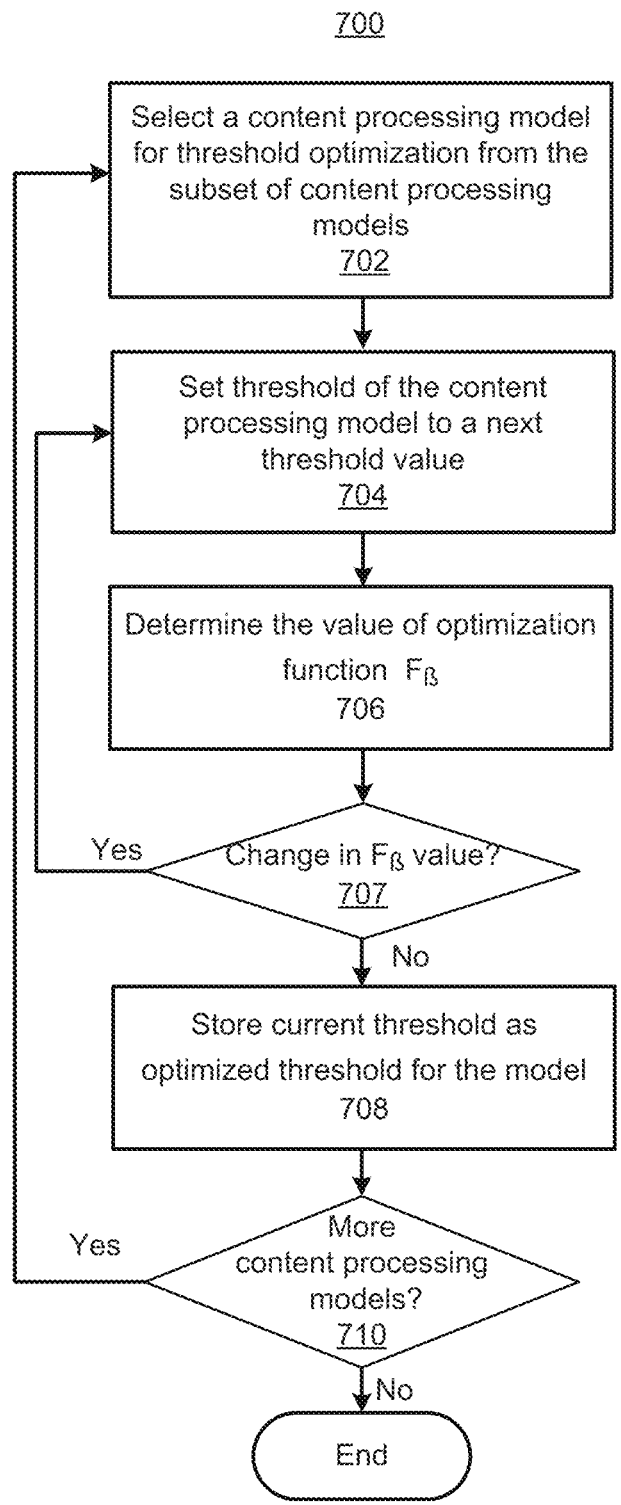
FIG. 7 illustrates details of a method to optimize thresholds of the content processing models, according to an example.

FIG. 7 illustrates details of a method 700 to optimize the thresholds of the content processing models in accordance with an example. According to the method 700, an optimization function based on precision/recall of known (historic) approved and rejected products is defined as shown in Eq. (1) above. The thresholds are then optimized for each model individually (e.g., one by one in a loop (or successive loop), but jointly in entire process) based on the historic data. At 702, one of the subset of content processing models 198 is selected for threshold optimization. The threshold of the selected content processing model may be set at 704 to a next value in a set of threshold values available for iterations. In an example, about 1000 quantiles from scores distribution produced by the selected content processing model may be used as a set of threshold values for the iterations. The thresholds of the other models in the subset of content processing models are kept constant at the corresponding current levels.

The value of the optimization function $F_\beta$ is determined at 706 using Eq. (1) with the model thresholds i.e., ß values obtained from 704. At 707, the current value of $F_\beta$ is compared to a prior value of $F_\beta$ to determine if there are any changes in the values. If it is determined that there is a change in the $F_\beta$ 707 the method iterates back to 704. If it is determined at 707 that the value of $F_\beta$ remained unchanged or if no measurable change is detected as compared to the $F_\beta$ value from a prior iteration, the current threshold value of the content processing model under test is stored as the optimized threshold for that content processing model at 708. At 710, it is determined if further content processing models in the subset of content processing models remain for threshold optimization. If yes, the method loops back to 702 to select the content processing model to be optimized. If it is determined at 710 that no further models from the subset of content processing models 198 remain for threshold optimization, the method terminates on the end block.

In practice, one of the sets of optimized thresholds 360, for example, the plurality of optimized thresholds 350 may be further weighted by factors corresponding to the various policy groupings. For example, the gated content groupings (e.g., alcohol and adult-health) groupings and sexual policies were optimized separately as the gating products have different treatments and the sexual policy may be the main prevalent policy that contributes ~50% to PVIL. In order to be better optimized towards the content selection tasks based on policy groupings, certain asymmetries may be introduced to $F_\beta$ the calculation. For recall, the PVIL weight multipliers were applied to the false-negative samples with high-risk violations multiplied by 2, mid-risk violations by 1 and low-risk violations by 0. By way of illustration, a content piece depicting violence against a demographic group may be identified as a high-risk violation and its optimization function value obtained for a given threshold from Eq. (1) is multiplied with 2. Similarly, a content piece related to adult health may be termed as a medium-risk violation and hence its optimization function value is multiplied with 1. Another content piece, which uses a trademark incorrectly, may be deemed as a low-risk violation and its optimization function value is multiplied with zero. However, no multipliers may be used for precision and low-risk samples may be discounted from false positives. For $F_\beta$ calculations, the current thresholds may be used to start the iterations with 1000 quantiles taken as threshold candidates for each content processing model from the model scores distribution in one example. Furthermore, while the calculations may be executed at the 'equivalent threshold' level, the results, in some scenarios, may be converted into scaling factors.

Figure 8:
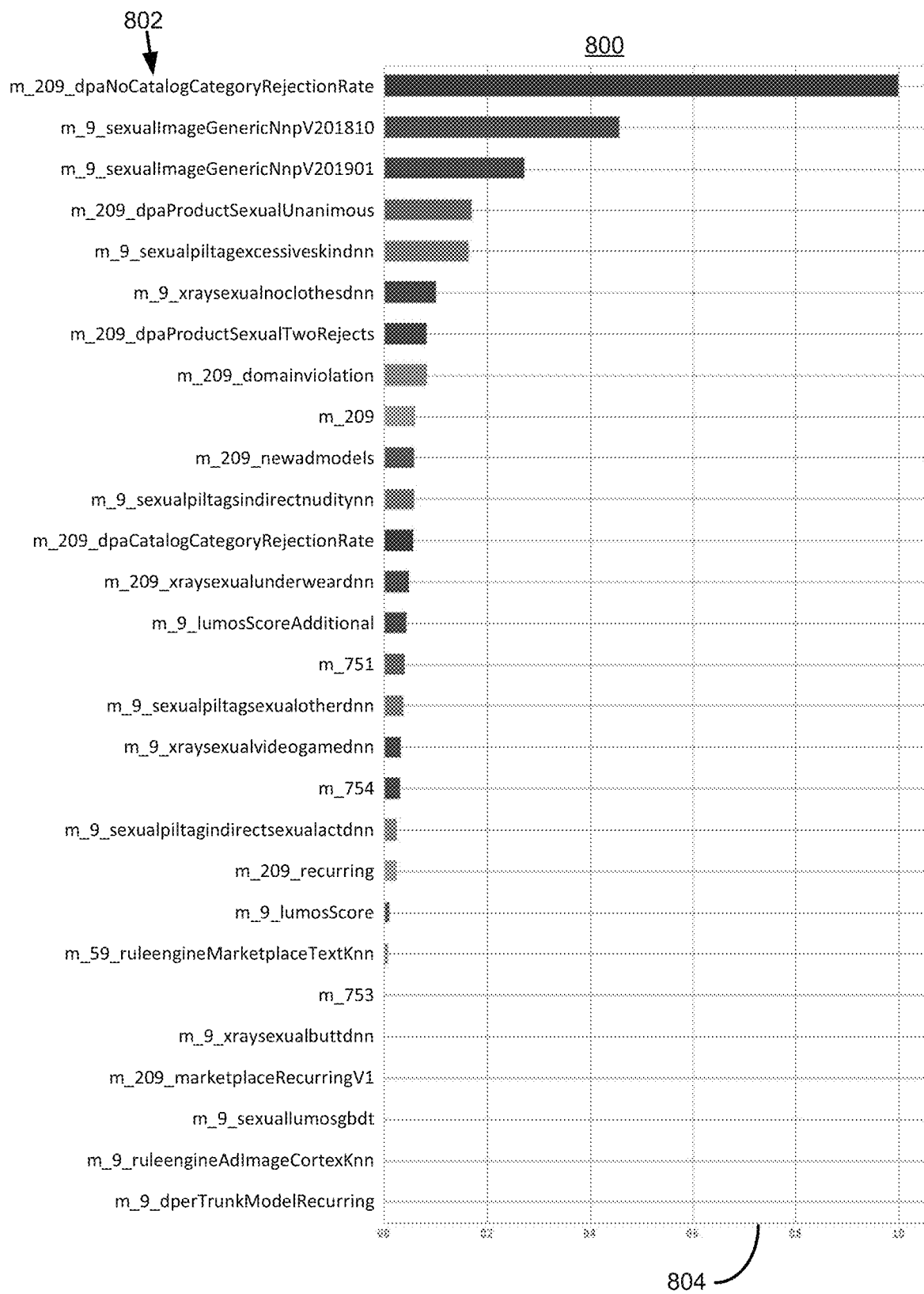
FIG. 8 illustrates a list of meta models for sexual policy grouping, according to an example.

FIG. 8 illustrates a list 800 of meta models for sexual policy grouping in accordance with an example. The meta models 802 may be listed in descending order of their importance. 804. It is noted that the first 20 or so models may be considered for threshold optimization in the second step of the dimension reduction process while the remaining content processing models may be disregarded for threshold optimization. In some examples, the list 800 of FIG. 8 may illustrate feature importance of a single metamodel. For instance, every existing model may be an input to the metamodel and this may be used to determine which models are important to include in the optimization. In some ways, what is shown in FIG. 8 may effectively be an outcome of what is shown in FIG. 6B.

Figure 9:
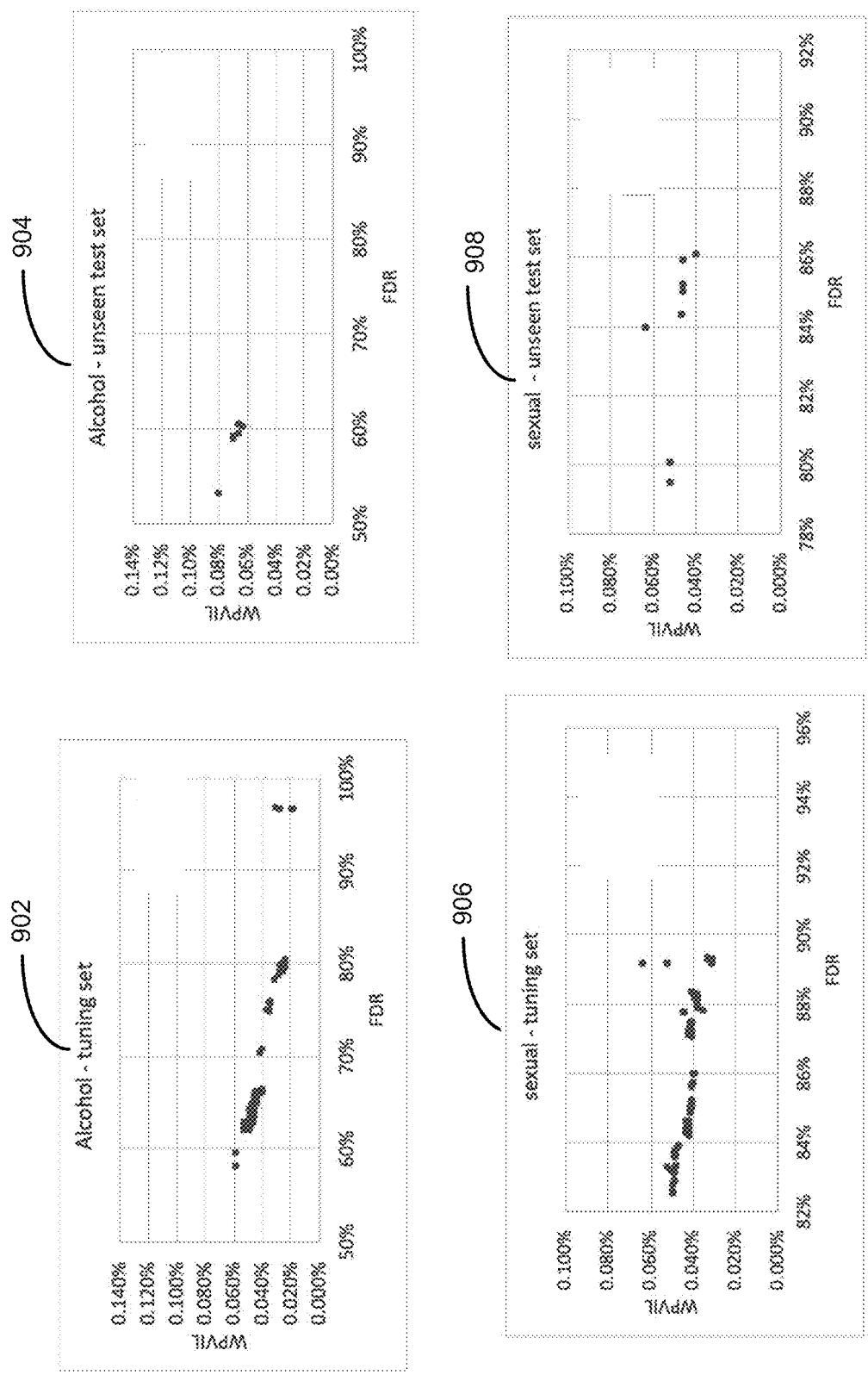
FIG. 9 illustrates results of threshold optimization of different policy groupings, according to an example.

FIG. 9 illustrates results 902-908 of optimization on different policy groupings. One policy grouping may relate to content relevant to gating policies for alcohol. It is seen at 902 that the PVIL metric in the current state may be around 0.12%, which may be bought down to 0.06% or even 0.02% depending on the optimized model thresholds. While PVIL may be reduced to 0.02% this causes the FDR to increase to 90%. However, if a higher PVIL of around 0.06% is desired, a lower FDR of around 60% may need to be tolerated. The results of the optimized thresholds obtained from the tuning sets 902, which include the combinations of PVIL and FDR, may be applied to an unseen set at the plot 904. The different points in plot 904 may be generated using different ß values. It should be noted that the optimized thresholds for the content processing models handling alcohol policy grouping may settle at a PVIL of 0.06% with FDR of around 60%. Similarly, the tuning set for sexual policy grouping may be shown at 906, while the results when applied on the unseen set may be shown at 908. In the case of sexual policy grouping, it may be seen that a PVIL between 0.06%-0.04% is tolerated while the FDR rates are higher as sexual content may be considered as a content category with a different risk level (and therefore different PVIL weight multiplier) as compared to alcohol policy grouping.

It should be noted that the functionality described herein may be subject to one or more privacy policies, described below, enforced by the threshold optimizer 100 that may bar use of images for concept detection, recommendation, generation, and analysis.

In particular examples, one or more objects (e.g., content or other types of objects) of a computing system may be associated with one or more privacy settings. The one or more objects may be stored on or otherwise associated with any suitable computing system or application, such as, for example, the threshold optimizer 100, the computing device 160, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" of users or other entities that should not be allowed to access certain information associated with the object. In particular examples, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the threshold optimizer 100 or shared with other systems (e.g., an external data source 130). Although this disclosure describes using particular privacy settings in a particular manner, this disclosure contemplates using any suitable privacy settings in any suitable manner.

In particular examples, the threshold optimizer 100 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the threshold optimizer 100 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular examples, different privacy settings may be provided for different user groups or user demographics. As an example and not by way of limitation, a first user may specify that other users who attend the same university as the first user may view the first user's pictures, but that other users who are family members of the first user may not view those same pictures.

In particular examples, the threshold optimizer 100 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular examples, privacy settings may allow a first user to specify (e.g., by opting out, by not opting in) whether the threshold optimizer 100 may receive, collect, log, or store particular objects or information associated with the user for any purpose. In particular examples, privacy settings may allow the first user to specify whether particular applications or processes may access, store, or use particular objects or information associated with the user. The privacy settings may allow the first user to opt in or opt out of having objects or information accessed, stored, or used by specific applications or processes. The threshold optimizer 100 may access such information in order to provide a particular function or service to the first user, without the threshold optimizer 100 having access to that information for any other purposes. Before accessing, storing, or using such objects or information, the threshold optimizer 100 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the threshold optimizer 100.

In particular examples, a user may specify whether particular types of objects or information associated with the first user may be accessed, stored, or used by the threshold optimizer 100. As an example and not by way of limitation, the first user may specify that images sent by the first user through the threshold optimizer 100 may not be stored by the threshold optimizer 100. As another example and not by way of limitation, a first user may specify that messages sent from the first user to a particular second user may not be stored by the threshold optimizer 100. As yet another example and not by way of limitation, a first user may specify that all objects sent via a particular application may be saved by the threshold optimizer 100.

In particular examples, privacy settings may allow a first user to specify whether particular objects or information associated with the first user may be accessed from other client devices or external systems. The privacy settings may allow the first user to opt in or opt out of having objects or information accessed from a particular device (e.g., the phone book on a user's smart phone), from a particular application (e.g., a messaging app), or from a particular system (e.g., an email server). The threshold optimizer 100 may provide default privacy settings with respect to each device, system, or application, and/or the first user may be prompted to specify a particular privacy setting for each context. As an example and not by way of limitation, the first user may utilize a location-services feature of the threshold optimizer 100 to provide recommendations for restaurants or other places in proximity to the user. The first user's default privacy settings may specify that the threshold optimizer 100 may use location information provided from a client device of the first user to provide the location-based services, but that the threshold optimizer 100 may not store the location information of the first user or provide it to any external data source 130. The first user may then update the privacy settings to allow location information to be used by a third-party image-sharing application in order to geo-tag photos.

In particular examples, privacy settings may allow a user to specify whether current, past, or projected mood, emotion, or sentiment information associated with the user may be determined, and whether particular applications or processes may access, store, or use such information. The privacy settings may allow users to opt in or opt out of having mood, emotion, or sentiment information accessed, stored, or used by specific applications or processes. The threshold optimizer 100 may predict or determine a mood, emotion, or sentiment associated with a user based on, for example, inputs provided by the user and interactions with particular objects, such as pages or content viewed by the user, posts or other content uploaded by the user, and interactions with other content of the online social network. In particular examples, the threshold optimizer 100 may use a user's previous activities and calculated moods, emotions, or sentiments to determine a present mood, emotion, or sentiment. A user who wishes to enable this functionality may indicate in their privacy settings that they opt in to the threshold optimizer 100 receiving the inputs necessary to determine the mood, emotion, or sentiment. As an example and not by way of limitation, the threshold optimizer 100 may determine that a default privacy setting is to not receive any information necessary for determining mood, emotion, or sentiment until there is an express indication from a user that the threshold optimizer 100 may do so. By contrast, if a user does not opt in to the threshold optimizer 100 receiving these inputs (or affirmatively opts out of the threshold optimizer 100 receiving these inputs), the threshold optimizer 100 may be prevented from receiving, collecting, logging, or storing these inputs or any information associated with these inputs. In particular examples, the threshold optimizer 100 may use the predicted mood, emotion, or sentiment to provide recommendations or advertisements to the user. In particular examples, if a user desires to make use of this function for specific purposes or applications, additional privacy settings may be specified by the user to opt in to using the mood, emotion, or sentiment information for the specific purposes or applications. As an example and not by way of limitation, the threshold optimizer 100 may use the user's mood, emotion, or sentiment to provide newsfeed items, pages, friends, or advertisements to a user. The user may specify in their privacy settings that the threshold optimizer 100 may determine the user's mood, emotion, or sentiment. The user may then be asked to provide additional privacy settings to indicate the purposes for which the user's mood, emotion, or sentiment may be used. The user may indicate that the threshold optimizer 100 may use his or her mood, emotion, or sentiment to provide newsfeed content and recommend pages, but not for recommending friends or advertisements. The threshold optimizer 100 may then only provide newsfeed content or pages based on user mood, emotion, or sentiment, and may not use that information for any other purpose, even if not expressly prohibited by the privacy settings.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. As another example and not by way of limitation, a company may post content related to a product release ahead of the official launch, and specify that the content may not be visible to other users until after the product launch.

In particular examples, for particular objects or information having privacy settings specifying that they are ephemeral, the threshold optimizer 100 may be restricted in its access, storage, or use of the objects or information. The threshold optimizer 100 may temporarily access, store, or use these particular objects or information in order to facilitate particular actions of a user associated with the objects or information, and may subsequently delete the objects or information, as specified by the respective privacy settings. As an example and not by way of limitation, a first user may transmit a message to a second user, and the threshold optimizer 100 may temporarily store the message in a content data store until the second user has viewed or downloaded the message, at which point the threshold optimizer 100 may delete the message from the data store. As another example and not by way of limitation, continuing with the prior example, the message may be stored for a specified period of time (e.g., 2 weeks), after which point the threshold optimizer 100 may delete the message from the content data store.

In particular examples, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular examples, the threshold optimizer 100 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the threshold optimizer 100. The user's privacy settings may specify that such information may be used only for particular processes, such as authentication, and further specify that such information may not be shared with any external system or used for other processes or applications associated with the threshold optimizer 100. As another example and not by way of limitation, the threshold optimizer 100 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice-print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any external system or used by other processes or applications associated with the threshold optimizer 100. As another example and not by way of limitation, the threshold optimizer 100 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any external system or used by other processes or applications associated with the threshold optimizer 100.

In particular examples, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The threshold optimizer 100 may determine that this privacy setting also applies to the first image and make the first image visible only to the first user group. In particular examples, the change in privacy settings may take effect only going forward. Continuing the example above, if the first user changes privacy settings and then shares a second image, the second image may be visible only to the first user group, but the first image may remain visible to all users. In particular examples, in response to a user action to change a privacy setting, the threshold optimizer 100 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the threshold optimizer 100 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular examples, upon determining that a trigger action has occurred, the threshold optimizer 100 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the threshold optimizer 100 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the threshold optimizer 100 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the threshold optimizer 100 may send a reminder to the user to confirm his or her privacy settings every six months or after every ten photo posts. In particular examples, privacy settings may also allow users to control access to the objects or information on a per-request basis. As an example and not by way of limitation, the threshold optimizer 100 may notify the user whenever an external data source 130 attempts to access information associated with the user, and require the user to provide verification that access should be allowed before proceeding.

What has been described and illustrated herein are examples of the disclosure along with some variations. The terms, descriptions, and figures used herein are set forth by way of illustration only and are not meant as limitations.

Many variations are possible within the scope of the disclosure, which is intended to be defined by the following claims—and their equivalents—in which all terms are meant in their broadest reasonable sense unless otherwise indicated.

The invention claimed is:

1. A system, comprising:
a processor;
a memory storing instructions which, when executed by the processor, cause the processor to:
select, from content processing models used to process content pieces, a subset of content processing models for content policy groupings, wherein the subset of content processing models comprises one or more content processing models selected based on at least one of content rejection rates or model predictability;
apply an iterative global optimization technique across the subset of content processing models;
obtain a threshold for each model of the subset of content processing models based on the iterative global optimization technique;
approve or reject content pieces based on policies associated with a corresponding content policy grouping in an online system by employing at least one of the subset of content processing models; and
output the approved content pieces for display to users on the online system.

2. The system of claim 1, wherein each of the content pieces comprises at least one content component, and wherein the content component comprises at least one of a product, an image, or textual content.

3. The system of claim 1, wherein selecting the subset of content processing models comprises:
determining a descending order of the content processing models based on content rejections of the content pieces generated by the content processing models for a predetermined time period and metadata associated with the content rejections;
selecting, using the metadata, a top N content processing models that reject a highest number of the content pieces, where N is a natural number; and
adding the top N content processing models to the subset of content processing models.

4. The system of claim 3, wherein selecting the subset of content processing models further comprises:
constructing an artificial intelligence (AI) classifier-based meta model for the corresponding content policy grouping by employing as features, historical model scores of the content pieces categorized under the corresponding content policy grouping, wherein the historical model scores are generated by the content processing models that remain after the selection of the content processing models based on the content rejection rates; and
adding the content processing models from the remaining content processing models that meet a minimum threshold importance to the subset of content processing models as the content processing models selected based on the model predictability.

5. The system of claim 4, wherein selecting the subset of content processing models further comprises:
discarding from further processing, from the remaining content processing models, the content processing models that do not meet the minimum threshold importance.

6. The system of claim 1, wherein obtaining the threshold for each model of the subset of content processing models comprises:
selecting a content processing model from the subset of content processing models;
obtaining a value of an optimization function $F_\beta$ for a free parameter ($\beta$) value, wherein the optimization function is expressed by the following:

$$F_\beta = \frac{(1+\beta^2)}{\left(\frac{1}{\text{precision}} + \frac{\beta^2}{\text{recall}}\right)}$$

wherein "precision" is a value indicating a precision of the selected content processing model in approving or rejecting the content pieces, and "recall" indicates a content rejection rate of the selected content processing model; and
selecting a combination of a policy-violating impression live (PVIL) value and a false discovery rate (FDR) value, wherein the combination of PVIL and FDR is associated with a threshold based on the value of the optimization function $F_\beta$.

7. The system of claim 6, wherein the iterative global optimization technique comprises:
repeating the steps of selecting the content processing model, obtaining the value of the optimization function $F_\beta$ using an iterative global optimization until no measurable change is observed in the optimization function $F_\beta$ value, and varying the free parameter ($\beta$) in a selected range.

8. The system of claim 7, wherein the iterative global optimization technique further comprises:
maintaining corresponding current thresholds in first iterations for each of the subset of content processing models.

9. The system of claim 6, wherein approving or rejecting the content pieces based on policies comprises:
applying a PVIL weight multiplier to false-negative content rejections, wherein the PVIL weight multiplier multiplies the value of the optimization function for the content pieces including high-risk violations, medium-risk violations and low-risk violations by respective weights for recall.

10. The system of claim 9, wherein approving or rejecting the content pieces based on policies further comprises:
discarding the low-risk violations from false-positives for precision.

11. The system of claim 1, wherein at least one of the content policy groupings relates to gating content for alcohol and sexual content.

12. The system of claim 1, wherein approving or rejecting content pieces comprises:
determining values for the content pieces by employing one or more content processing models of the subset of content processing models; and
comparing the values of the content pieces with the threshold for each model of the subset of content processing models.

13. The system of claim 1, wherein approving or rejecting content pieces comprises:
applying additional rules to the content pieces when rendering the content pieces to users on a social network platform.

14. A method comprising:
- automatically optimizing thresholds of a subset of content processing models that process content having different content components, wherein each content component is processed by one of the subset of content processing models;
- receiving content pieces, wherein each content piece comprises one or more of the different content components;
- providing the content pieces to the subset of content processing models with the automatically optimized thresholds; and
- transmitting automatically selected content pieces to users of a social network platform, wherein the content pieces are automatically selected by employing one or more of the subset of content processing models based on policies of corresponding content policy groupings.

15. The method of claim 14, wherein automatically optimizing thresholds of the subset of content processing models further comprising:
- selecting the subset of content processing models from a plurality of content processing models, wherein the subset of content processing models includes one or more of the plurality of content processing models selected based on corresponding content rejection rates and corresponding precisions of the subset of content processing models;
- applying an iterative global optimization technique across the subset of content processing models; and
- obtaining an optimized threshold for each content processing model of the subset of content processing models based on the iterative global optimization technique.

16. The method of claim 15, wherein the iterative global optimization technique comprising:
- calculating values of an optimization function for different thresholds for the subset of content processing models.

17. The method of claim 16, further comprising:
- weighing the values of the optimization function by a weight multiplier corresponding to one or more of the content policy groupings.

18. The method of claim 14, wherein automatically optimizing thresholds of the subset of content processing models further comprising:
- automatically optimizing a threshold of each content processing model of the subset of content processing models for one of the content policy groupings.

19. A non-transitory computer-readable storage medium having executable instructions stored thereon, which when executed instructs a processor to:
- select a subset of content processing models from a plurality of content processing models, wherein the subset of content processing models includes one or more of the plurality of content processing models that are selected based on corresponding content rejection rates and corresponding precisions of the content processing models in selecting or rejecting content;
- apply an iterative global optimization technique across the subset of content processing models;
- determine a threshold automatically for each content processing model of the subset of content processing models based on the iterative global optimization technique;
- receive content pieces that comprise one or more content components;
- provide the content pieces to the subset of content processing models with the automatically determined thresholds; and
- transmit automatically selected content pieces to users of a social network platform, wherein the content pieces are automatically selected by employing one or more of the subset of content processing models with the automatically determined thresholds based on policies of corresponding content policy groupings.

20. The non-transitory computer-readable storage medium of claim 19, further comprising executable instructions that when executed cause the processor to:
- weigh an optimization function by a weight multiplier for one or more of the content policy groupings.

* * * * *